United States Patent
Tozu et al.

(10) Patent No.: US 6,422,660 B2
(45) Date of Patent: Jul. 23, 2002

(54) BRAKE CONTROL SYSTEM FOR A VEHICLE

(75) Inventors: Kenji Tozu, Yokkaichi; Akitaka Nishio, Okazaki, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/782,156

(22) Filed: Feb. 14, 2001

(30) Foreign Application Priority Data

Feb. 18, 2000 (JP) .......................... 2000-042086

(51) Int. Cl.$^7$ ................................ B60T 8/44
(52) U.S. Cl. ................. 303/113.3; 303/114.3; 303/115.3
(58) Field of Search .................. 303/113.3, 114.3, 303/113.2, 139, 144; 180/197

(56) References Cited

U.S. PATENT DOCUMENTS

| | | | |
|---|---|---|---|
| 4,966,248 A | | 10/1990 | Farr |
| 5,265,945 A | * | 11/1993 | Yamashita et al. .......... 180/197 |
| 5,338,107 A | * | 8/1994 | Rossigno et al. ......... 303/113.3 |
| 5,487,325 A | * | 1/1996 | Bayliss et al. ............. 91/376 R |
| 5,887,955 A | * | 3/1999 | Ando et al. .................... 303/11 |
| 6,019,439 A | * | 2/2000 | Drumm et al. .......... 303/114.3 |
| 6,283,559 B1 | * | 9/2001 | Yamada et al. .......... 303/113.3 |
| 6,302,497 B1 | * | 10/2001 | Takayama ................ 303/113.3 |

FOREIGN PATENT DOCUMENTS

JP            2790288           6/1988

* cited by examiner

*Primary Examiner*—Paul N. Dickson
*Assistant Examiner*—Robert A. Sicconolfi
(74) *Attorney, Agent, or Firm*—Burns, Doane, Swecker & Mathis, LLP (57) ABSTRACT

The present invention is directed to a brake control system, which includes wheel brake cylinders, a master cylinder, a reservoir communicated with the wheel brake cylinders, normally open solenoid valves disposed between the master cylinder and the wheel brake cylinders, respectively, normally closed solenoid valves disposed between the wheel brake cylinders and the reservoir, respectively, a hydraulic pump for supplying the brake fluid to a passage for connecting the master cylinder with the normally open valves, and an automatically pressurizing device (e.g., a vacuum booster with a changeover valve) which is provided for advancing the master piston irrespective of operation of the pump and the brake pedal to generate hydraulic braking pressure from the master cylinder. It is so controlled that a distance of the master piston, which is advanced by the automatically pressurizing device when all of the normally open valves are closed during the hydraulic pressure control of the wheel brake cylinders, is greater than the distance of the master piston, which is advanced by the automatically pressurizing device when at least one of the normally open valves is open during the hydraulic pressure control of the wheel brake cylinders.

6 Claims, 8 Drawing Sheets

\# BRAKE CONTROL SYSTEM FOR A VEHICLE

This application claims priority under 35 U.S.C. Sec. 119 to No. 2000-42086 filed in Japan on Feb. 18, 2000, the entire content of which is herein incorporated by reference.

BACKGROUND OF THE INVENTION

1. Field of the Invention

The present invention relates to a brake control system for a vehicle, which is adapted to perform a traction control, anti-skid control, steering control by braking and other various controls, and especially relates to the brake control system having automatically pressurizing means for advancing a master piston irrespective of operation of a brake pedal to generate hydraulic braking pressure from a master cylinder.

2. Description of the Related Arts

In Japanese patent No. 2790288, which corresponds to the U.S. Pat. No. 4,966,248, there is disclosed a traction control system, wherein fluid pressure produced by a master cylinder is provided by actual pressure on a brake pedal together with supplemental pressure provided by a vacuum servo unit incorporating an electromagnetic valve. When the electromagnetic valve is de-energized, it allows the servo unit to only operate to provide-supplemental pressure when pressure is applied to the brake pedal, and when energized, it connects the servo unit to atmosphere so that the servo unit can by itself apply fluid pressure to a wheel brake via the modulation unit. The electromagnetic valve is energized when a wheel commences to spin faster than the other wheels.

It is described in the patent that the system includes a normally open solenoid valve 1,5 and a normally closed solenoid valve 16, and includes a-solenoid valve 35 which is connected to the servo unit 13 and energized for controlling traction. The braking force applied to the wheel can be controlled in the same manner as with an antilock system with the fluid being returned by al pump to the master cylinder.

According to the traction control system as disclosed in the above-described patent, the brake fluid in a reservoir is returned by the pump to the master cylinder. In that system, if the communication between the master cylinder and all of the wheel brakes (wheel brake cylinders) are blocked during the traction control, the hydraulic pressure in the master cylinder is so high that the brake pedal can not be operated. In the case where it is so constituted that the operation of the brake pedal is detected by a stroke of the brake pedal, therefore, the operation can not be detected in the above case, so that the traction control can not be terminated, even if the brake pedal was operated during that control. Of course, brake feeling to a driver will not be appropriate, in that case.

SUMMARY OF THE INVENTION

Accordingly, it is an object of the present invention to provide a vehicle brake control system having an automatically pressurizing device for advancing a master piston irrespective of operation of a brake pedal to generate hydraulic braking pressure from a master cylinder, wherein a brake pedal stroke can be ensured, even if the communication between the master cylinder and all of wheel brake cylinders is blocked during a hydraulic pressure control.

In accomplishing the above and other objects, the vehicle brake control system includes wheel brake cylinders operatively mounted on wheels of a vehicle, respectively, a master cylinder for advancing a master piston at least in response to operation of a brake pedal to supply brake fluid to the wheel brake cylinders, a reservoir communicated with the wheel brake cylinders for storing the brake fluid drained therefrom, normally open solenoid valves disposed between the master cylinder and the wheel brake cylinders, respectively, normally closed solenoid valves disposed between the wheel brake cylinders and the reservoir, respectively, and a hydraulic pump for introducing the brake fluid stored in the reservoir and supplying the brake fluid to a passage for connecting the master cylinder with the normally open solenoid valves. The system further includes an automatically pressurizing device which is provided for advancing the master piston irrespective of operation of the pump and the brake pedal to generate hydraulic braking pressure from the master cylinder, and a controller which is provided for actuating the normally open solenoid valves, the normally closed solenoid valves, the pump and the automatically pressurizing device, to control the hydraulic braking pressure in the wheel brake cylinders. The controller is provided for controlling a distance of the master piston, which is advanced by the automatically pressurizing device when all of the normally open solenoid valves are closed during the hydraulic pressure control of the wheel brake cylinders, to be greater than the distance of the master piston, which is advanced by the automatically pressurizing device when at least one of the normally open solenoid valves is open during the hydraulic pressure control of the wheel brake cylinders.

According to the system as described above, the stroke of the brake pedal can be ensured, even if the communication between the master cylinder and all of the wheel brake cylinders is blocked during a pressure control. Therefore, a traction control can be terminated in response to a variation of the stroke of the brake pedal, for example.

In the system as described above, the controller may be adapted to execute a specific terminating control, by which the automatically pressurizing device is actuated for a predetermined time period after the hydraulic pressure control of the wheel brake cylinders is terminated, with all of the normally open solenoid valves closed, to provide the maximum distance of the master piston advanced by the automatically pressurizing device. According to this system, if the automatic pressurization performed by the automatically pressurizing device starts within the predetermined time period after the previous automatic pressurization was terminated, the automatically pressurizing device is being actuated during that period. Therefore, frequent stopping and starting the device can be avoided. During the specific terminating control, all of the normally open solenoid valves are closed, so that the master cylinder pressure generated by the automatically pressurizing device can be avoided from being supplied to the wheel brake cylinders. Furthermore, the maximum distance of the master piston is advanced by the automatically pressurizing device during the specific terminating control, so that the stroke of the brake pedal can be ensured, even when all of the normally open solenoid valves are closed during the specific terminating control.

In the system as described above, the controller may be adapted to execute a delay control, by which the pump is actuated for a predetermined time period after the hydraulic pressure control of the wheel brake cylinders is terminated, and adapted to prohibit the delay control, in the case where the specific terminating control is executed, and where the brake fluid in the reservoir is less than a predetermined amount when the brake pedal is not operated. According to this system, it can be avoided that the brake fluid in the reservoir is returned to the master cylinder by means of the pump during the specific terminating control. Therefore, the stroke of the brake pedal can be ensured certainly.

Preferably, the controller may be adapted to execute the specific terminating control only when the brake pedal is not operated. Accordingly, the master cylinder pressure can be certainly supplied to the wheel brake cylinders in response to operation of the brake pedal.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 2:
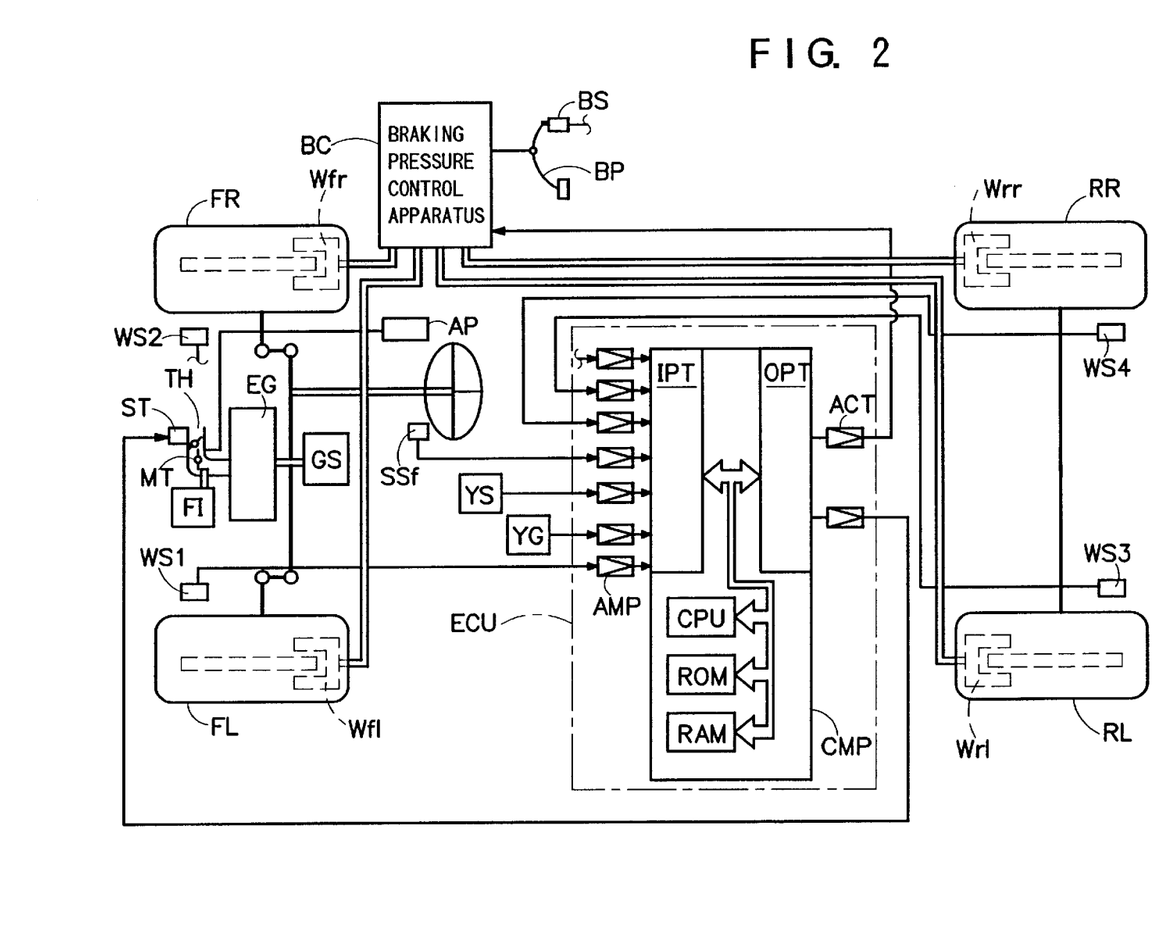
FIG. 2 is a schematic block diagram of a vehicle having a brake control system according to an embodiment of the present invention.

Referring to FIG. 2, there is schematically illustrated a vehicle having a brake control system according to the present invention. The vehicle has an engine EG provided with a fuel injection apparatus FI and a throttle control apparatus TH which is arranged to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the front wheels FL, FR through a transmission GS to provide a front-drive system, but the present embodiment is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 1:
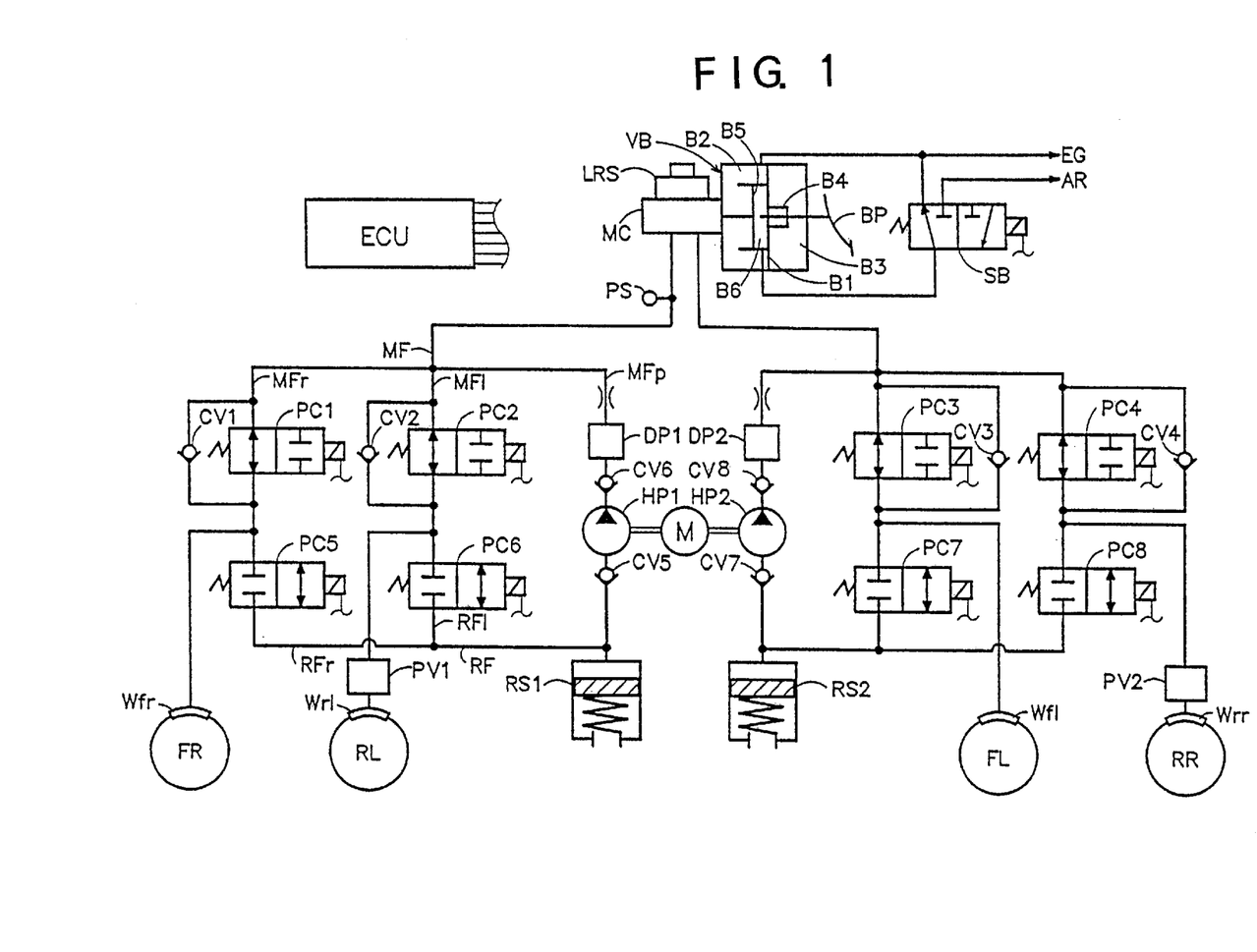
FIG. 1 is a block diagram illustrating an embodiment of a brake control system according to an embodiment of the present invention.

With respect to a braking system according to the present embodiment, wheel brake cylinders Wfl, Wfr, Wrl, Wrr are operatively mounted on the wheels FL, FR, RL, RR of the vehicle, respectively, and which is fluidly connected to a hydraulic braking pressure control apparatus BC. The pressure control apparatus BC in the present embodiment may be arranged as illustrated in FIG. 1 which will be explained later in detail. According to the present embodiment, a so-called diagonal circuit system has been employed, but a front-rear circuit system may be employed.

As shown in FIG. 2, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU.

As shown in FIG. 2, the electronic controller ECU is provided with a microcomputer CMP which includes a central processing unit or CPU, a read-only memory or ROM, a random access memory or RAM, an input port IPT, an output port OPT, and the like. The signals detected by each of the wheel speed sensors WS1 to WS4, brake switch BS, front steering angle sensor SSf, yaw rate sensor YS, lateral acceleration sensor YG and the like are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 3 to 7, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 1 shows the hydraulic braking pressure control apparatus BC according to the present embodiment, which includes a master cylinder MC and a vacuum booster VB which are activated in response to operation of the brake pedal BP. The master cylinder MC is boosted by the vacuum booster VB to pressurize the brake fluid in a low-pressure reservoir LRS and discharge the master cylinder pressure to two hydraulic braking pressure circuits for the wheels FR and RL, and the wheels FL and RR, respectively. The master cylinder MC is of a tandem type having two pressure chambers communicated with the two hydraulic braking pressure circuits, respectively. That is a first pressure chamber is communicated with the hydraulic braking pressure circuit for the wheels FR and RL, and a second pressure chamber is communicated with the hydraulic braking pressure circuit for the wheels FL and RR. At the output side of the master cylinder MC, a pressure sensor PS is provided for detecting its output, i.e., master cylinder pressure.

The vacuum booster VB according to the present embodiment is substantially the same as the prior vacuum booster, so that it has a constant pressure chamber B2 and a variable pressure chamber B3 separated by a movable wall B1. On the movable wall B1 is operatively mounted a valve mechanism B4, which includes a vacuum valve (not shown) for communicating the constant pressure chamber B2 with the variable pressure chamber B3, or blocking the communication between them, and an air valve (not shown.) for communicating the variable pressure chamber B3 with the atmosphere, or blocking the communication between them. The constant pressure chamber B2 is always communicated with an intake manifold (not shown) of the engine EG to introduce the negative pressure into the chamber B2. The variable pressure chamber B3 is selectively communicated with the atmosphere, or communicated with the constant pressure chamber B2 to introduce the negative pressure into the chamber B3, by means of the valve mechanism B4. In response to operation of the brake pedal BP, therefore, the vacuum valve and air valve of the valve mechanism B4 are actuated to produce a pressure difference between the constant chamber B2 and the variable pressure chamber B3. As a result, the output force increased in response to operation of the brake pedal BP is transmitted to the master cylinder MC.

In the constant pressure chamber B2 of the vacuum booster VB according to the present embodiment, an auxiliary movable wall B5 is disposed to define an auxiliary variable pressure chamber B6 between the movable wall B1 and the auxiliary movable wall B5. The auxiliary movable wall B5 can be moved toward the master cylinder MC in accordance with the movement of the brake pedal BP, and also it can be moved toward the master cylinder MC irrespective of the brake pedal BP to actuate the master cylinder MC. That is, the auxiliary variable pressure chamber B6 is selectively communicated with the atmosphere, or communicated with the intake manifold of the engine EG to introduce the negative pressure, in accordance with a position of a booster changeover valve SB.

Figure 8:
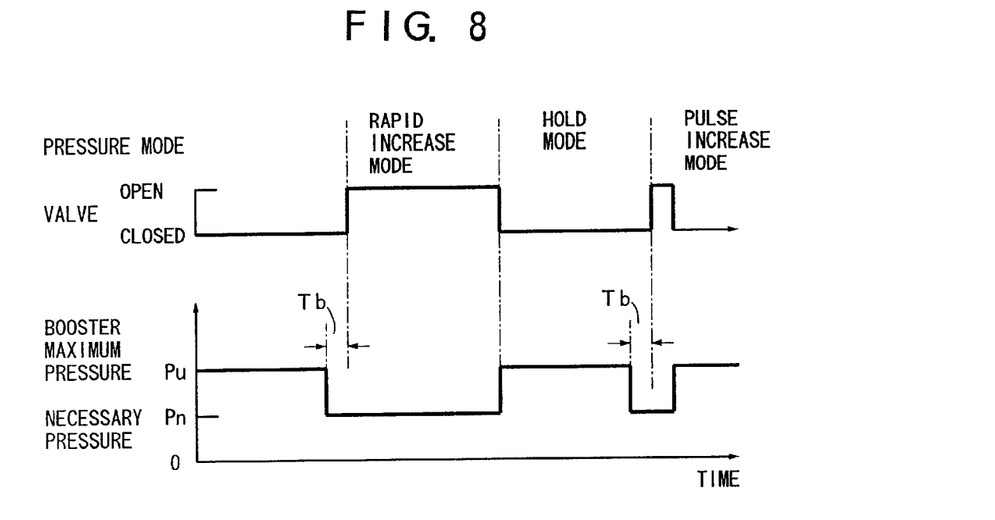
FIG. 8 is a diagram showing an example of a state where the maximum pressure and minimum pressure pressurized by a booster are set according to an embodiment of the present invention.

The booster changeover valve SB is a linear solenoid valve, which is selectively placed through duty control in a first position where the auxiliary variable pressure chamber B6 is communicated with the intake manifold of the engine EG, together with the constant pressure chamber B2, and a second position where the auxiliary variable pressure chamber B6 is communicated with the atmosphere (designated by "AR" in FIG. 1). Accordingly, when the negative pressure is applied to the auxiliary variable pressure chamber B6 through the booster changeover valve SB, the auxiliary movable wall B5 is held to be apart from the movable wall B1 by a constant distance, and moved toward the master cylinder MC in accordance with the forward movement of the brake pedal BP. When the auxiliary variable pressure chamber B6 is communicated with the atmosphere, the pressure difference is produced between the chamber B6 and the constant pressure chamber B2 under the negative pressure. Consequently, the master cylinder MC is actuated in response to movement of the auxiliary movable wall B5, irrespective of operation of the brake pedal BP (even if the brake pedal BP has not been depressed). According to the present embodiment, when the booster changeover valve SB is turned on, the duty is set to be 100% to provide the maximum pressure (Pu), whereas the duty is reduced to provide the necessary pressure (Pn) in the increasing pressure control modes, as shown in FIG. 8.

In the hydraulic braking pressure circuit for the wheels FR and RL, the first pressure chamber is communicated with the wheel brake cylinders Wfr and Wfl, respectively, through a main passage MF and its branch passages MFr, MFl. And, normally open two-port two-position solenoid operated switching valves PC1 and PC2 (hereinafter, simply referred to as solenoid valves PC1 and PC2) are disposed in the branch passages MFr and MFl, respectively Also, normally closed two-port two-position solenoid operated switching valves PC5 and PC6 (hereinafter, simply referred to as solenoid valves PC5 and PC6) are disposed in the branch passages RFr and RFl, respectively, which merge into the drain passage RF connected to the reservoir RS1.

In parallel with the solenoid valves PC1 and PC2, the check valves CV1 and CV2 are provided for allowing the flow of the brake fluid toward the master cylinder MC, and preventing the flow in the wheel brake cylinders Wfr and Wrl. The brake fluid in the wheel brake cylinders Wfr and Wrl is returned to the master cylinder MC, and then to the low-pressure reservoir LRS through the check valves CV1 and CV2. Accordingly, if the brake pedal BP is released, the hydraulic pressure in the wheel brake cylinders Wfr and Wrl is rapidly reduced to the pressure lower than the pressure in the master cylinder MC.

In the hydraulic braking pressure circuit for the wheels FR and RL, the solenoid valves PC1, PC2, PC5 and PC6 form a modulator. A hydraulic pressure pump HP1 is disposed in a passage MFp connected to the branch passages MFr and MFl at the upstream of the solenoid valves PC1 and PC2. The pressure pump HP1 and a pressure pump HP2 are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and a spring to function as an accumulator for storing a necessary volume of the brake fluid for various controls as described later.

An outlet of the pressure pump HP1 is connected to the solenoid valves PC1 and PC2 through a check valve CV6 and a damper DP1. The check valve CV5 is provided for preventing the flow of the brake fluid toward the reservoir RS1 and allowing the reverse flow. The check valve CV6 is provided for restricting the flow of the brake fluid discharged from the pressure pump HP1 to a predetermined direction, and normally formed within the pressure pump HP1 in a body. The damper DP1 is disposed at the outlet side of the pressure pump HP1, and a proportioning valve PV1 is disposed in a passage connected to the rear wheel brake cylinder Wrl.

In the hydraulic braking pressure circuit for the wheels FL and RR, are disposed a reservoir RS2, damper DP2, proportioning valve PV2, normally open two-port two-position solenoid operated switching valve PC3 and PC4, normally closed two-port two-position solenoid operated switching valves PC7 and PC8, and check valves CV3, CV4, CV7 and CV8. The solenoid valves PC1–PC8 are controlled by the electronic controller ECU to perform the steering control by braking, and so on.

In operation, every valves are placed in their normal positions as shown in FIG. 1 and the motor M is stopped, during the normal braking operation. When the brake pedal BP is depressed, with the valves in the conditions as shown in FIG. 1, the master cylinder MC is actuated to discharge the master cylinder pressure from the first and second pressure chambers to the hydraulic braking pressure circuit for the wheels FR and RL, and the hydraulic braking pressure circuit for the wheels FL and RR, respectively, and supply the pressure into the wheel brake cylinders Wfr, Wrl, Wfl and Wrr, through the solenoid valves PC1–PC8. Since the hydraulic braking pressure circuits for the wheels FR and RL and the wheels FL and RR are substantially the same, only the hydraulic braking pressure circuit for the wheels FR and RL will be explained hereinafter.

During the braking operation, when the wheel FR tends to be locked for example, and the anti-skid control is initiated, the solenoid valve PC1 is charged to its closed position, and the solenoid valve PC5 is placed in its open position. As a result, the brake fluid in the wheel brake cylinder Wfr is drained into the reservoir RS1 through the solenoid valve PC5 to reduce the pressure in the wheel brake cylinder Wfr. When a pulse pressure increase mode is selected for the wheel brake cylinder Wfr, the solenoid valve PC5 is placed in its closed position and the solenoid valve PC1 is placed in its open position, so that the master cylinder pressure is supplied from the master cylinder MC to the wheel brake cylinder Wfr through the solenoid valve PC1 in its open position. Then, the solenoid valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the solenoid valves PC2 and PC5 are placed in the closed positions, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1, and consequently to the low pressure reservoir LRS. Thus, an independent braking torque control is performed with respect to each wheel.

When the traction control is initiated to start an anti-slip control operation for the wheel FR under the accelerating operation, for example, the solenoid valves PC2–PC4 are placed in the closed positions, with the solenoid valve PCd placed in its open position. In this state, if the pump HP1 is driven by the motor M, the pressurized brake fluid is immediately supplied to the wheel brake cylinder Wfr operatively mounted on the driven wheel, through the solenoid valve PC1. When the solenoid valve PC1 is placed in its closed position, the pressure in the wheel brake cylinder Wfr is held. Also, the booster changeover valve SB is placed in its second position, so that the auxiliary variable pressure chamber B6 is communicated with the atmosphere, and the auxiliary movable wall B5 is moved irrespective of operation of the brake pedal BP, thereby to advance the master piston of the master cylinder MC. Accordingly, even if the brake pedal BP is not depressed, when the acceleration slip control is performed with respect to the wheel FR, for example, the auxiliary pressurization is performed by the solenoid valves PCd and PC5 which are energized and de-energized alternately in response to the acceleration slip of the wheel FR to provide a pressure control mode out of the pulse pressure increase, pulse pressure decrease and hold modes for the wheel brake cylinder Wfr. Whereby, the braking torque is applied to the wheel FR to limit its rotating force, so that the accelerating slip is effectively prevented to perform the traction control properly.

Furthermore, in case of the steeling control by braking, the motor M is actuated to discharge the brake fluid from the pressure pump HP1, and the solenoid valves PC1, PC2, PC5 and PC6 are energized and de-energized alternately, so that the hydraulic pressure in each of the wheel braking cylinders Wfr and Wrl is gradually increased, decreased or held. Likewise, those in the hydraulic circuit for the wheels FL, FR are controlled. Consequently, the braking force distribution between the front and rear wheels is controlled to keep the course trace performance of the vehicle. For example, when it is determined that the excessive oversteer occurs during cornering, the braking torque will be applied to a front wheel located on the outside of the curve in the vehicle's path.

Figure 3:
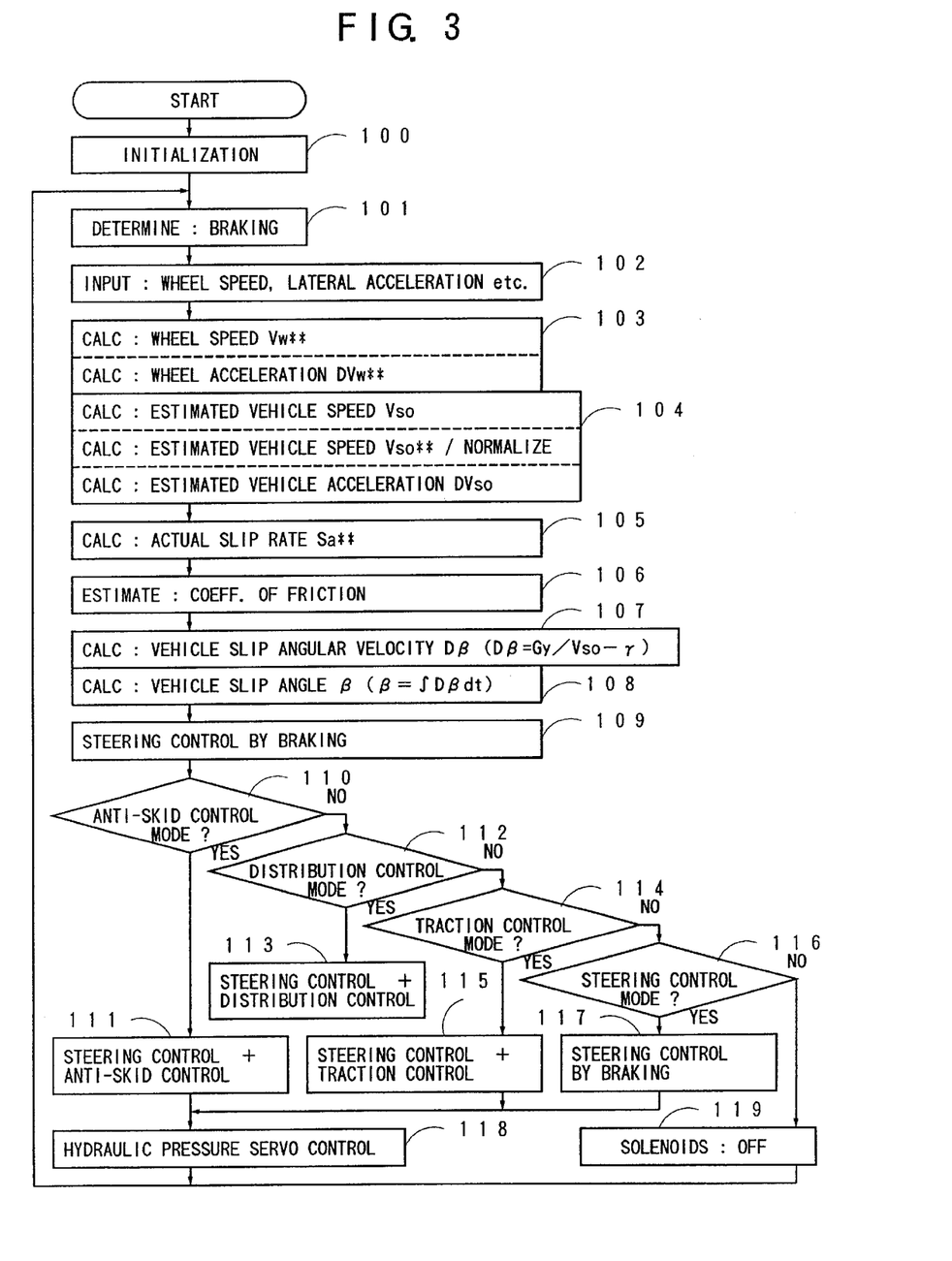
FIG. 3 is a flowchart showing a main routine of a vehicle control according to an embodiment of the present invention.

According to the present embodiment as constituted above, a program routine for the vehicle motion control including the steering control by braking anti-skid control and so on is executed by the electronic controller ECU, as will be described hereinafter with reference to FIGS. 3 to 7. The program routine starts when an ignition switch (not shown) is turned on. At the outset, the program for the brake control as shown in FIG. 3 provides for initialization of the system at Step 100 to clear various data. Then, determination of braking is made at Step 101 to determine if the vehicle is under a braking condition, as will be described later referring to FIG. 4. At Step 102, the signals detected by the wheel speed sensors WS1 to WS4 are read by the electronic controller ECU, and also read are the signal (steering angle δf) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration (including an estimated vehicle deceleration with opposite sign) DVso on the gravity center of the vehicle. At Step 105, also calculated is an actual slip rate Sa on the basis of the wheel speed Vw for each wheel and the estimated vehicle speed Vso** (or, the estimated and normalized vehicle speed) which are calculated at Steps 103 and 104, respectively, in accordance with the following equation:

$$Sa^{}=(Vso^{}-Vw^{})/Vso^{}$$

Then, at Step 106, on the basis of the vehicle acceleration DVso on the gravity center of the vehicle and the actual lateral acceleration Gya detected by the lateral acceleration sensor YG, the coefficient of friction $\mu$ against a road surface can be calculated in accordance with the following equation:

$$\mu \approx (DVso^2+Gya^2)^{1/2}$$

In order to detect the coefficient of friction against the road surface, various methods may be employed other than the above method, such as a sensor for directly detecting the coefficient of friction against the road surface.

Then, the program proceeds to Steps 107 and 108, where a vehicle slip angular velocity Dβ is calculated, and a vehicle slip angle β is calculated. This vehicle slip angle β is an angle which corresponds to a vehicle slip against the vehicle's path of travel, and which can be estimated as follows. That is, at the outset, the vehicle slip angular velocity $D\beta$, which is a differentiated value $d\beta/dt$ of the vehicle slip angle $\beta$, is calculated at Step 107 in accordance with the following equation:

$$D\beta = Gy/Vso - \gamma$$

Then, the vehicle slip angle $\beta$ is calculated at Step 108 in accordance with the following equation:

$$\beta = \int (Gy/Vso - \gamma)dt$$

where "Gy" is the lateral acceleration of the vehicle, "Vso" is the estimated vehicle speed of the vehicle measured at its gravity center, and "$\gamma$" is the yaw rate.

The program further proceeds to Step 109 where the mode for the steering control by braking is made to provide a desired slip rate for use in the steering control by braking, wherein the braking torque applied to each wheel is controlled at Step 118 through the hydraulic pressure servo control which will be explained later. The steering control by braking is to be added to each control performed in all the control modes described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If the result is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 101. If it is determined at Step 116 that the condition for initiating the steering control by braking has not been fulfilled, the program proceeds to Step 119 where solenoids for all of the solenoid valves are turned off, and then the program returns to Step 101. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

Figure 4:
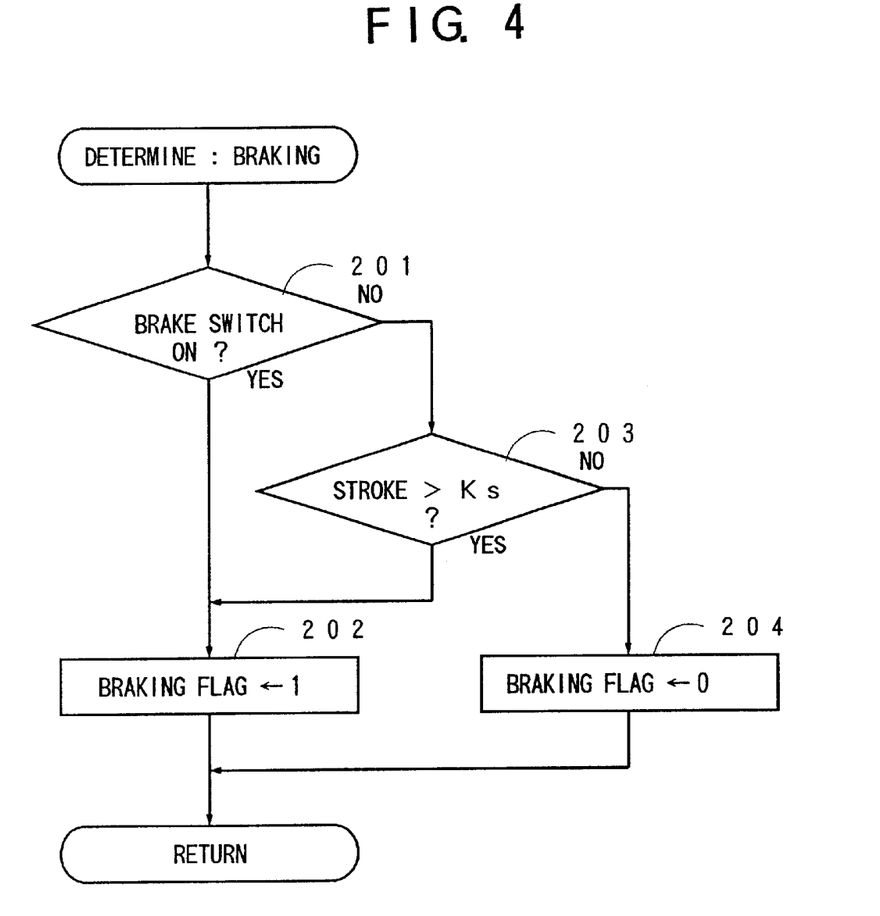
FIG. 4 is a flowchart showing a subroutine for determining braking operation according to an embodiment of the present invention.

Next will be explained referring to FIG. 4, the determination of braking to be executed at Step 101 in FIG. 3. At the outset, it is determined at Step 201 whether the brake switch BS is on or off. If the brake switch BS is on, it is determined that the vehicle is being braked, so that the program proceeds to Step 202 where a braking flag is set (1). If the brake switch BS is off, the program further proceeds to Step 203 where a stroke detected by the stroke sensor BR is compared with a predetermined value Ks. If the detected stroke exceeds the predetermined value Ks, it is determined that the vehicle is being braked, so that the program proceeds to Step 202 where the braking flag is set. If the detected stroke is equal to or smaller than the predetermined value Ks, it is determined that the vehicle is not being braked, so that the program proceeds to Step 204 where the braking flag is reset (0).

Figure 5:
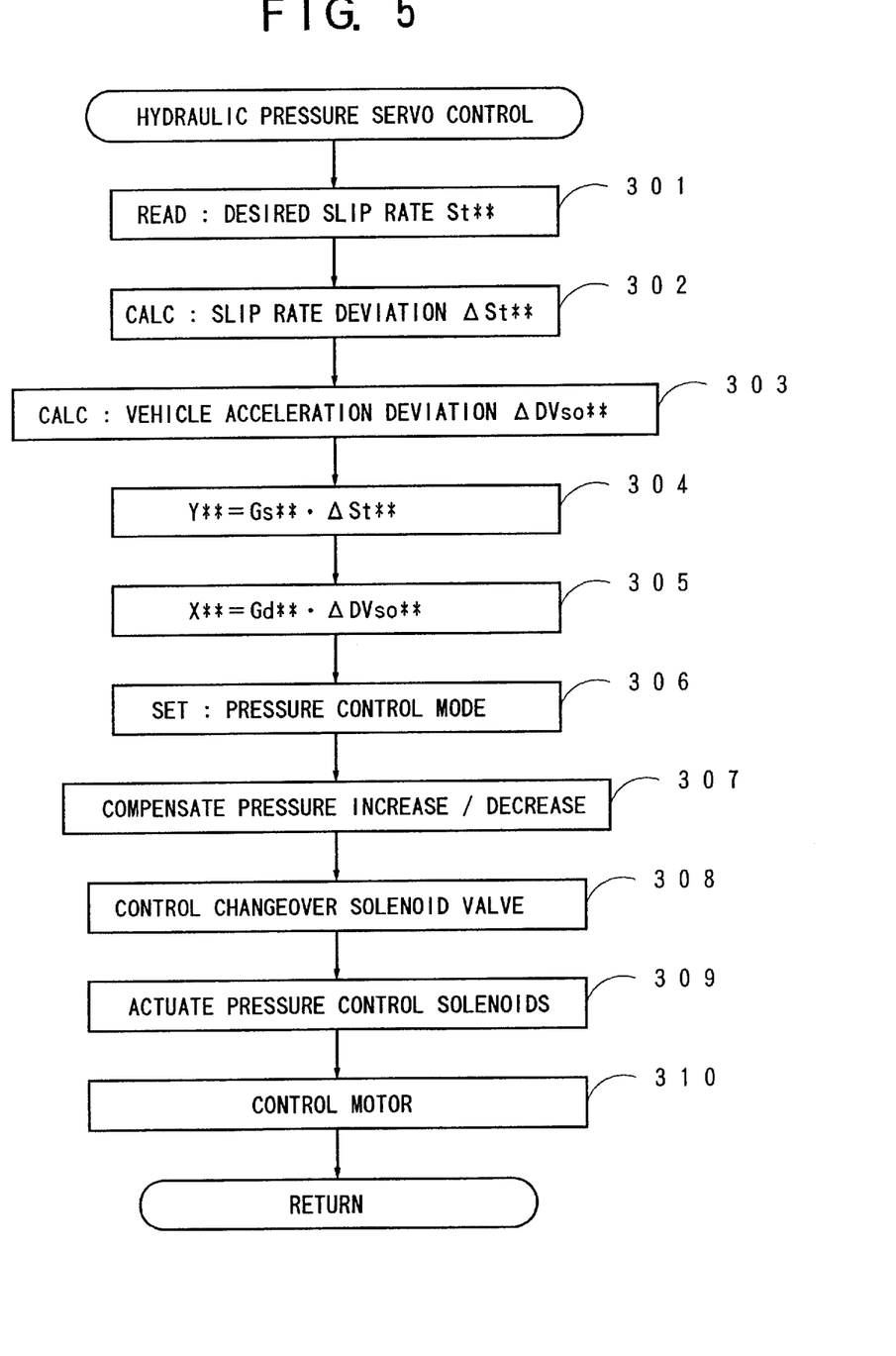
FIG. 5 is a flowchart showing a subroutine of a hydraulic pressure servo control according to an embodiment of the present invention.

FIG. 5 shows the hydraulic pressure servo control which is executed at Step 118 in FIG. 3, and wherein the wheel cylinder pressure for each wheel is controlled through the slip rate servo control. At Step 301, the desired slip rates $St^{}$, which are set in accordance with control modes, are read to provide the desired slip rate for each wheel of the vehicle. Then, the program proceeds to Step 302 where a slip rate deviation $\Delta St^{}$ is calculated for each wheel, and further proceeds to Step 303 where a vehicle acceleration deviation $\Delta DVso^{}$ is calculated. At Step 302, the difference between the desired slip rate $St^{}$ and the actual slip rate $Sa^{}$ is calculated to provide the slip rate deviation $\Delta St^{}$ (i.e., $\Delta St^{} = St^{} - Sa^{}$). And, at Step 303, the difference between the estimated vehicle acceleration DVso on the center of gravity of the vehicle and the vehicle acceleration $DVw^{}$ of a selected wheel is calculated to provide the vehicle acceleration deviation $\Delta DVso^{}$. The actual slip rate $Sa^{}$ and the vehicle acceleration deviation $\Delta DVso^{**}$ may be calculated in accordance with a specific manner which is determined in dependence upon the control modes such as the anti-skid control mode, traction control mode or the like, the explanation of which will be omitted.

Then, the program proceeds to Step 304 where a parameter $Y^{**}$ for providing a hydraulic pressure control in each control mode is calculated in accordance with the following equation:

$$Y^{} = Gs^{} \cdot \Delta St^{**}$$

where "$Gs^{}$" is a gain, which is provided in response to the vehicle slip angle $\beta$. The program further proceeds to Step 305 where another parameter $X^{}$ is calculated in accordance with the following equation:

$$X^{} = Gd^{} \cdot \Delta DVso^{**}$$

where "$Gd^{}$" is a gain which is a constant value. On the basis of the parameters $X^{}$ and $Y^{}$, a pressure control mode for each wheel is provided at Step 306, in accordance with a control map (not shown). The control map has a rapid pressure decrease zone, a pulse pressure decrease zone, a pressure hold zone, a pulse pressure increase zone, and a rapid pressure increase zone which are provided in advance, so that any one of the zones is selected in accordance with the parameters $X^{}$ and $Y^{**}$ at Step 306. In the case where no control mode is performed, no pressure control mode is provided (i.e., solenoids are off).

At Step 307, is performed a pressure increase and decrease compensating control, which is required for smoothing the first transition and last transition of the hydraulic pressure, when the presently selected zone is changed from the previously selected zone at Step 306, e.g., from the pressure increase zone to the pressure decrease zone, or vice versa. When the zone is changed from the rapid pressure decrease zone to the pulse pressure increase zone, for instance, the rapid pressure increase control is performed for a period which is determined on the basis of a period during which the rapid pressure decrease mode, which was provided immediately before the rapid pressure increase control, lasted. Then, the program proceeds to Step 308, where the booster changeover valve SB is actuated, as will be described later with reference to FIG. 6. Then, the program proceeds to Step 309 where the solenoid PC* (PC1–PC8) of each valve constituting the modulator is actuated in accordance with the pressure control mode as described above, to control the braking torque applied to each wheel. Then, the program proceeds to Step 310, where the motor M is driven, as will be described later with reference to FIG. 7.

Figure 6:
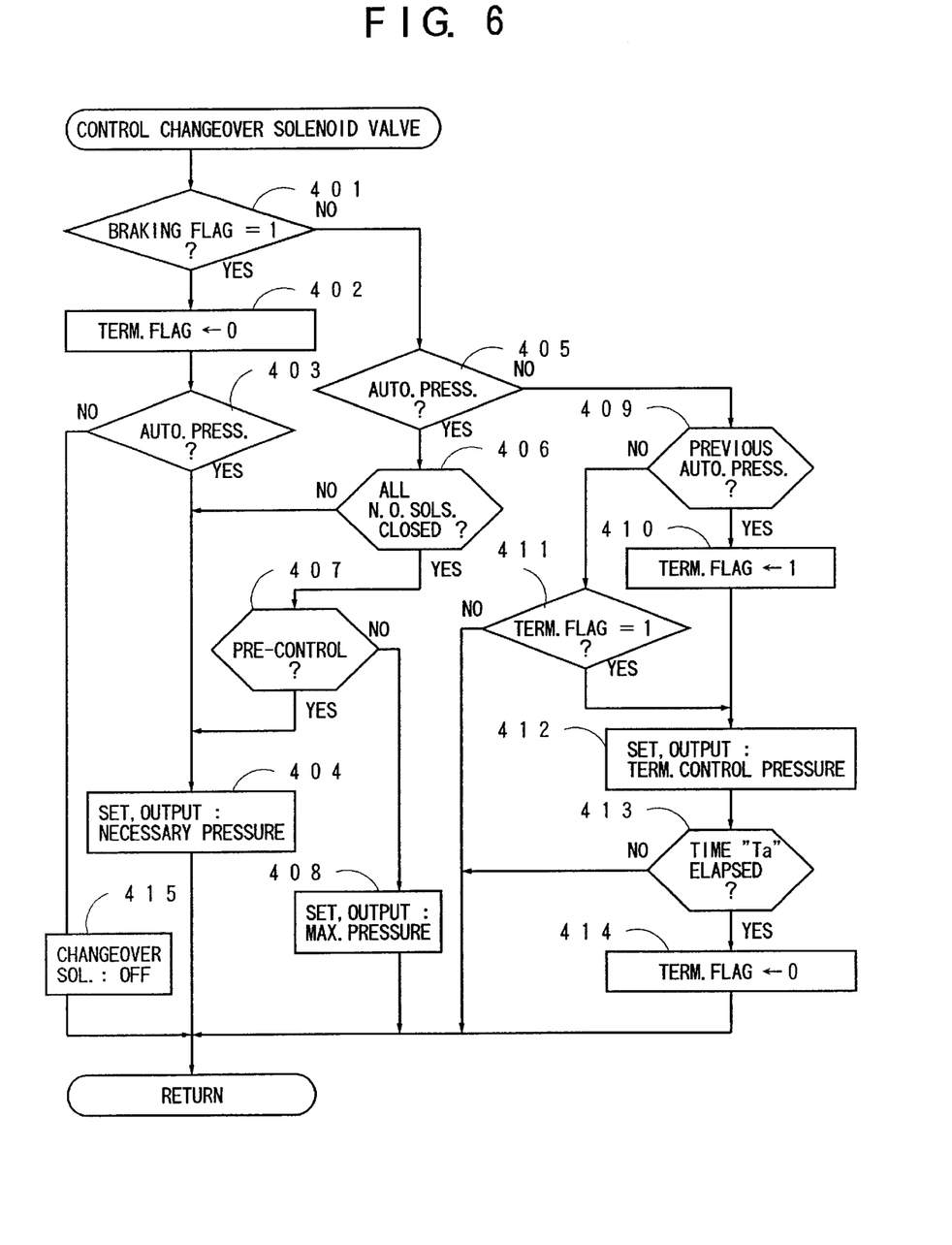
FIG. 6 is a flowchart showing a subroutine for controlling a booster changeover valve according to an embodiment of the present invention.

Next, the control of the booster changeover valve executed at Step 308 will be explained, referring to FIG. 6. At the outset, is determined the state of the braking flag, which is the result determined at Step 101 in FIG. 3. If the braking flag has been set (1), a specific terminating flag is reset (0) at Step 402, and then it is determined at Step 403 whether the automatic pressurization is being made, e.g., under the steering control by braking, or under the traction control. If the automatic pressurization is being made, the program proceeds to Step 404, where pressure (Pn) necessary for the control by the vacuum booster VB is set as shown in FIG. 8, so that the booster changeover valve SB is actuated with a duty provided in response to the necessary pressure (Pn). If it is determined that the automatic pressurization is not being made, the booster changeover valve SB is turned off at Step 415. If it is determined at Step 401 that the braking flag has not been set, so that the pressure control is not being made, then the program proceeds to Step 405 where it is determined whether the automatic pressurization is being made, or not. If it is determined that the automatic pressurization is being made, the program proceeds to Step 406, where it is determined whether the pressure control modes for the wheel brake cylinders of all the wheels are the hold mode or the pressure decreasing mode, i.e., whether all of the normally open solenoid valves PC1–PC4 are placed in the closed positions.

When all of the normally open solenoid valves PC1–PC4 have been placed in the closed positions, the program proceeds to Step 407, where it is determined whether a specific control mode provided before starting the pressure control is being made, or not. For example, the specific control mode provided before starting the pressure control is being made at the time of Tb period before the rapid pressure increase mode and pulse pressure increase mode as shown in FIG. 8 are initiated. During that period, the pressure (Pn) necessary for the control by the vacuum booster VB is set, and the booster changeover valve SB is actuated at step 404 in accordance with a duty corresponding to the pressure (Pn) to be applied. If it is determined at Step 407 that the specific control mode provided before starting the pressure control is not being made, the pressure generated by the vacuum booster VB, which is controlled by the booster changeover valve SB, is set to provide the maximum pressure (Pu) as shown in FIG. 8. That is, the pressure applied to the master cylinder MC by the vacuum booster VB, which is controlled by the booster changeover valve SB, is set to be of the maximum value. If at least one of the normally open solenoid valves PC1–PC4 is placed in the open position, the program proceeds to Step 404, where the booster changeover valve SB is actuated in accordance with the duty corresponding to the pressure (Pn) necessary for the control by the vacuum booster VB.

Figure 9:
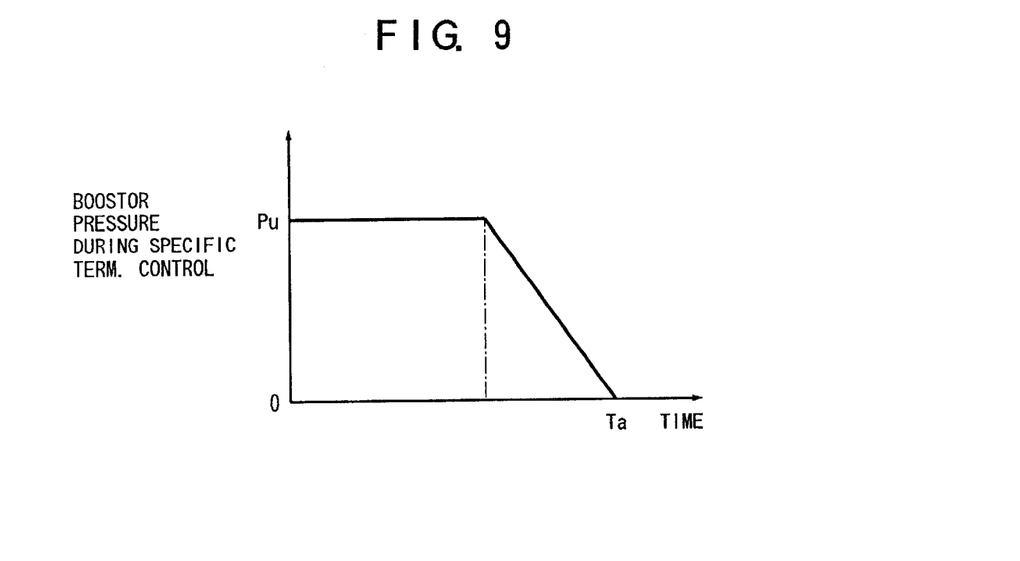
FIG. 9 is a diagram showing an example of a state where the pressure pressurized by the booster is set when a specific terminating control is performed according to an embodiment of the present invention.

If it is determined at Step 405 that the automatic pressurization is not being made, the program further proceeds to Step 409, where it is determined whether the automatic pressurization was made in the previous cycle, or not. If the result is affirmative, the program proceeds to Step 410 where the specific terminating flag is set, and then proceeds to Step 412. If it is not determined that the automatic pressurization was made in the previous cycle, the program proceeds to Step 411 where the state of the terminating flag is determined. When the terminating flag has not been set, the program returns to the main routine, otherwise the program proceeds to Step 412, where the pressure to be applied in the specific terminating control is set as shown in FIG. 9 and it is output. Then, at Step 413, it is determined whether the predetermined time Ta (e.g., 4 seconds) has elapsed. If the predetermined time Ta has elapsed, the program proceeds to Step 414 where the terminating flag is reset (0), and returns to the main routine. In other words, the pressure for the specific terminating control is set and output during the period of the predetermined time Ta, at Steps 412 and 413, and proceeds to Step 414, after having waited for the period of the predetermined time Ta. During the terminating control, the normally open solenoid valves PC1–PC4 are turned on to be placed in their closed positions, thereby to block the communication between the master cylinder MC and all of the wheel brake cylinders.

Thus, according to the present embodiment, even if all of the normally open solenoid valves PC1–PC4 are placed in their closed positions to block the communication between the master cylinder and all of the wheel brake cylinders, the pressure applied to the master cylinder MC by the vacuum booster VB, which is controlled by the booster changeover valve SB, is set to be of the maximum value. When the brake pedal BP is depressed, therefore, the master cylinder MC will be boosted by the vacuum booster VB to advance the piston, thereby to provide an appropriate brake pedal stroke certainly.

Figure 7:
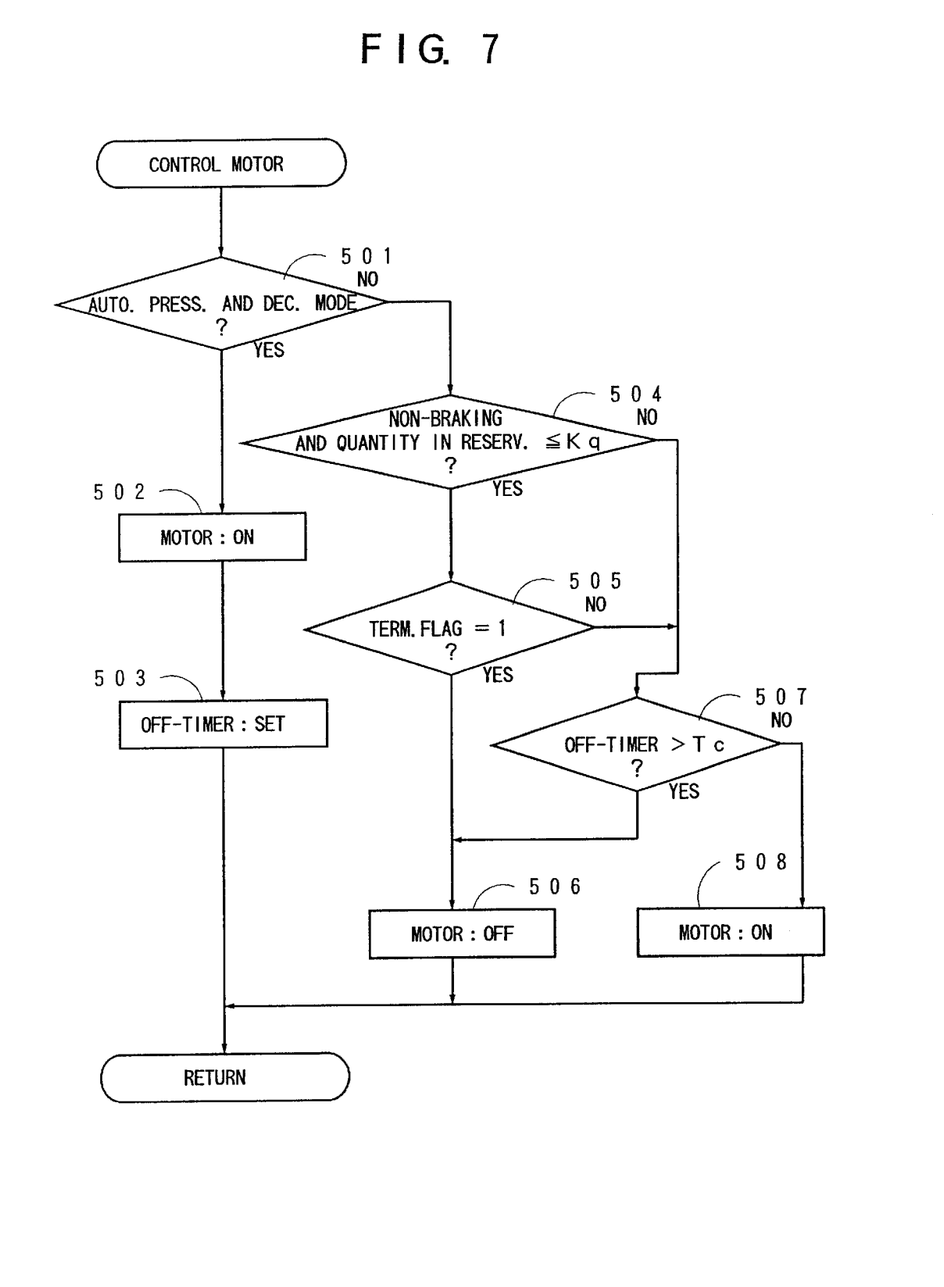
FIG. 7 is a flowchart showing a subroutine for controlling a motor according to an embodiment of the present invention.

Next will be explained about the sub-routine for controlling the motor to be executed at Step 310 in FIG. 5, with reference to FIG. 7. This routine is provided for actuating the hydraulic pressure pumps HP1, HP2 for a predetermined time period, in order to drain the brake fluid in the reservoirs RS1, RS2 certainly to be empty, after the terminating control has been executed. At Step 501, it is determined whether the automatic pressurization mode and the pressure decrease mode have been provided at the same time. If the result is affirmative, then the program proceeds to Step 502, where the motor M is turned on, and an offset timer is set at Step 503 to count the time until the motor M is turned off. If the result is negative at Step 501, the program proceeds to Step 504, where it is determined if the brake pedal BP is not depressed and the amount of brake fluid in the reservoir RS1(RS2) is equal to or less than a predetermined amount Kq. If these conditions are fulfilled, the program proceeds to Step 505, where it is determined whether the terminating flag has been set or not. If the terminating flag has been set, the program proceeds to Step 506 where the motor M is turned off. If the terminating flag has not been set, the program proceeds to Step 506, where it is determined if a predetermined time Tc (e.g., 0.3 sec.) has elapsed, after the off-timer set at Step 503 was counted up. If the predetermined time Tc has elapsed after the motor M was turned off, the motor is turned off at Step 506. Otherwise, the motor M is turned on at Step 508. Since the motor M is actuated for the predetermined time Tc as described above, the brake fluid in the reservoir RS1(RS2) is certainly drained to return to the master cylinder MC, so that the reservoir RS1(RS2) will become empty.

Although the vacuum booster VB and booster changeover valve SB are employed for the automatically pressurizing device according to the above embodiment, a hydraulic pressure booster may be employed instead of them.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:

wheel brake cylinders operatively mounted on wheels of said vehicle, respectively;

a master cylinder for advancing a master piston at least in response to operation of a brake pedal to supply brake fluid to said wheel brake cylinders;

reservoir means communicated with said wheel brake cylinders for storing the brake fluid drained therefrom;

normally open solenoid valves disposed between said master cylinder and said wheel brake cylinders, respectively;

normally closed solenoid valves disposed between said wheel brake cylinders and said reservoir means, respectively;

pump means for introducing the brake fluid stored in said reservoir means and supplying the brake fluid to a passage for connecting said master cylinder with said normally open solenoid valves;

automatically pressurizing means for advancing said master piston irrespective of operation of said pump means and said brake pedal to generate hydraulic braking pressure from said master cylinder; and control means for actuating said normally open solenoid valves, said normally closed solenoid valves, said pump means and said automatically pressurizing means to control the hydraulic braking pressure in said wheel brake cylinders, said control means controlling a distance of said master piston advanced by said automatically pressurizing means when all of said normally open solenoid valves are closed during the hydraulic pressure control of said wheel brake cylinders, to be greater than the distance of said master piston advanced by said automatically pressurizing means when at least one of said normally open solenoid valves is open during the hydraulic pressure control of said wheel brake cylinders.

2. A brake control system as set forth in claim 1, wherein said control means executes a specific terminating control, by which said automatically pressurizing means is actuated for a predetermined time period after the hydraulic pressure control of said wheel brake cylinders is terminated, with all of said normally open solenoid valves closed, to provide the maximum distance of said master piston advanced by said automatically pressurizing means.

3. A brake control system as set forth in claim 2, wherein said control means executes a delay control, by which said pump means is actuated for a predetermined time period after the hydraulic pressure control of said wheel brake cylinders is terminated, and wherein said control means prohibits said delay control, in the case where said specific terminating control is executed, and where the brake fluid in said reservoir means is less than a predetermined amount when said brake pedal is not operated.

4. A brake control system as set forth in claim 2, wherein said control means executes said specific terminating control only when said brake pedal is not operated.

5. A brake control system as set forth in claim 1, wherein said automatically pressurizing means comprises a vacuum booster for advancing said master piston in response to operation of said brake pedal, and a booster changeover valve for actuating said vacuum booster irrespective of operation of said brake pedal.

6. A brake control system as set forth in claim 5, wherein said vacuum booster comprises:

a housing;

a movable wall disposed in said housing for defining therein a variable pressure chamber and a constant pressure chamber communicated with a negative pressure source;

a valve mechanism operatively mounted on said movable wall, said valve mechanism producing a pressure difference between said variable pressure chamber and said constant pressure chamber in response to depression of said brake pedal; and an auxiliary movable wall disposed in said constant pressure chamber for defining an auxiliary variable pressure chamber between said movable wall and said auxiliary movable wall, said auxiliary movable wall being moved toward said master cylinder in response to depression of said brake pedal, and moved toward said master cylinder in response to the pressure in said auxiliary variable pressure chamber and irrespective of operation of said brake pedal to actuate said master cylinder, and wherein said booster changeover valve selectively communicates said auxiliary variable pressure chamber with the atmosphere, or communicates with said negative pressure source.

* * * * *